US006573824B1

(12) United States Patent
Lovegreen et al.

(10) Patent No.: US 6,573,824 B1
(45) Date of Patent: Jun. 3, 2003

(54) COMBINATION PAGING AND GAMING SYSTEM AND APPARATUS

(75) Inventors: Kenneth J. Lovegreen, Lake Kiowa, TX (US); Russell P. Blink, Plano, TX (US)

(73) Assignee: Long Range Systems, Inc., Dallas, TX (US)

( * ) Notice: Subject to any disclaimer, the term of this patent is extended or adjusted under 35 U.S.C. 154(b) by 0 days.

(21) Appl. No.: 09/564,000

(22) Filed: May 3, 2000

Related U.S. Application Data

(60) Provisional application No. 60/134,643, filed on May 18, 1999.

(51) Int. Cl.[7] .............................. G08B 5/22; H04Q 7/00; H04Q 5/22; G05B 19/00; G06F 7/00
(52) U.S. Cl. ........................................ 340/7.1; 340/5.62
(58) Field of Search ........................ 340/7.1, 5.62, 340/825.36, 825.37, 825.38, 7.26, 7.23; 273/292, 303–305

(56) References Cited

U.S. PATENT DOCUMENTS

| | | | | | |
|---|---|---|---|---|---|
| 4,254,404 A | * | 3/1981 | White | .................... | 340/311 |
| 5,351,970 A | * | 10/1994 | Fioretti | .................... | 273/439 |
| 5,489,894 A | * | 2/1996 | Murray | .................... | 340/825.44 |
| 5,663,717 A | * | 9/1997 | DeLuca | .................... | 340/825.36 |
| 5,929,774 A | * | 7/1999 | Charlton | .................... | 340/825.44 |
| 5,942,969 A | * | 8/1999 | Wicks | .................... | 340/286.02 |
| 5,999,808 A | * | 12/1999 | LaDue | .................... | 455/412 |
| 6,011,485 A | * | 1/2000 | Wicks | .................... | 340/825.44 |

* cited by examiner

Primary Examiner—Michael Horabik
Assistant Examiner—Nam Nguyen
(74) Attorney, Agent, or Firm—Steven W. Smith

(57) ABSTRACT

A combination paging and gaming system and apparatus enabling a user to utilize a pager to play an electronic game while waiting for a page. May be used as an on-premises paging system in a restaurant. A centralized control station includes a page transmitter and a plurality of buttons which may be pressed individually to send a page to one of an associated plurality of game pagers. The control station also includes a game transmitter and a text generator. A game input device inputs game questions and game answers to the control station. The game questions are sent to the text generator and to a television screen or scrolling display for display to all users. The game answers ate transmitted by the game transmitter to the game pagers. Alternatively, game questions may also be transmitted to the game pagers for display on an LED display. Each user enters an answer on a keypad on the game pager, and the pager then indicates whether the entered answer was right or wrong. Other games may be fully contained within the pager. With an optional transmitter in the game pager, games may be played competitively or interactively with other users.

15 Claims, 4 Drawing Sheets

COMBINATION PAGING AND GAMING SYSTEM AND APPARATUS

PRIORITY STATEMENT UNDER 35 U.S.C. §119 (e) & 37 C.F.R §1.78

This nonprovisional application claims priority based upon the prior U.S. provisional patent application entitled, "Combination Paging and Gaming System", application number 60/134,643, filed May 18, 1999, in the names of Kenneth J. Lovegreen and Russell P. Blink.

BACKGROUND OF THE INVENTION

1. Technical Field of the Invention

This invention relates to radio paging systems and, more particularly, to a combination paging and gaming system and apparatus enabling a user to utilize a pager to play an electronic game while waiting for a page.

2. Description of Related Art

FIG. 1 is a simplified block diagram of an existing on-premises paging system 10, such as a paging system used in restaurants to notify waiting customers that a table is available. A centralized control station 11 includes a page transmitter 12 and, for example, a plurality of buttons 13 which may be pressed individually to send a page to one of an associated plurality of pagers 14.

FIG. 2 is a simplified functional block diagram of one of the plurality of pagers 14 in the existing system of FIG. 1. The pager includes a page receiver 15 and a signal analyzer 16 which determines whether a received signal is intended for that pager. If the received signal is not intended for that pager, the pager takes no action as shown at 17. If the received signal is intended for that pager, the pager activates an alerting mechanism 18 which alerts the user that a page has been received. In the example of an on-premises paging system in a restaurant, lights in the pager may flash, or the pager may vibrate or beep to indicate to the customer that a table is ready.

In many restaurants, the wait for a table may be long and boring. These restaurants, therefore, need a way to make the wait more enjoyable for their customers. Existing paging systems are inadequate for this purpose. Pagers may be made in the shape of a coaster for use in a bar area while waiting, but the paging system performs no entertainment function. In order to overcome the disadvantage of existing systems, it would be advantageous to have an on-premises paging system that makes the waiting period more enjoyable for the customer. The present invention provides such a system.

SUMMARY OF THE INVENTION

In one aspect, the present invention is a combination paging and gaming system that includes a transmitter for transmitting paging signals, and a combination pager and electronic game device. The combination pager and electronic game device includes a receiver for receiving the paging signals, an alerting mechanism connected to the receiver for alerting a user that a page has been received, and an electronic game for playing by the user while waiting for a page.

In another aspect, the present invention is a combination pager and electronic game device comprising a radio frequency (RF) receiver, an alerting mechanism connected to the receiver for alerting a user that a paging signal has been received, and an electronic game for playing by the user while waiting for a page.

In a particular embodiment, the present invention is an on-premises paging system for use, for example, in a restaurant. The paging system provides the user with the opportunity to play a game while waiting for a table to become available. The game may be fully contained within the pager, or the game may be broadcast from a transmitter station to the pager. In alternative embodiments, the game may be played passively by the user or may be played interactively by the user. Interactive play may be handled entirely within the pager, or alternatively, user inputs may be transmitted back to a control station for keeping score and for competing with other users.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is an on-premises paging system which provides the user with the opportunity to play a game while waiting for a page to be received. The game may be fully contained within the pager, or the game may be broadcast from a transmitter station to the pager. In alternative embodiments, the game may be played passively by the user or may be played interactively by the user. Interactive play may be handled entirely within the pager, or alternatively, user inputs may be transmitted back to a control station for keeping score and for competing with other users.

Figure 1:
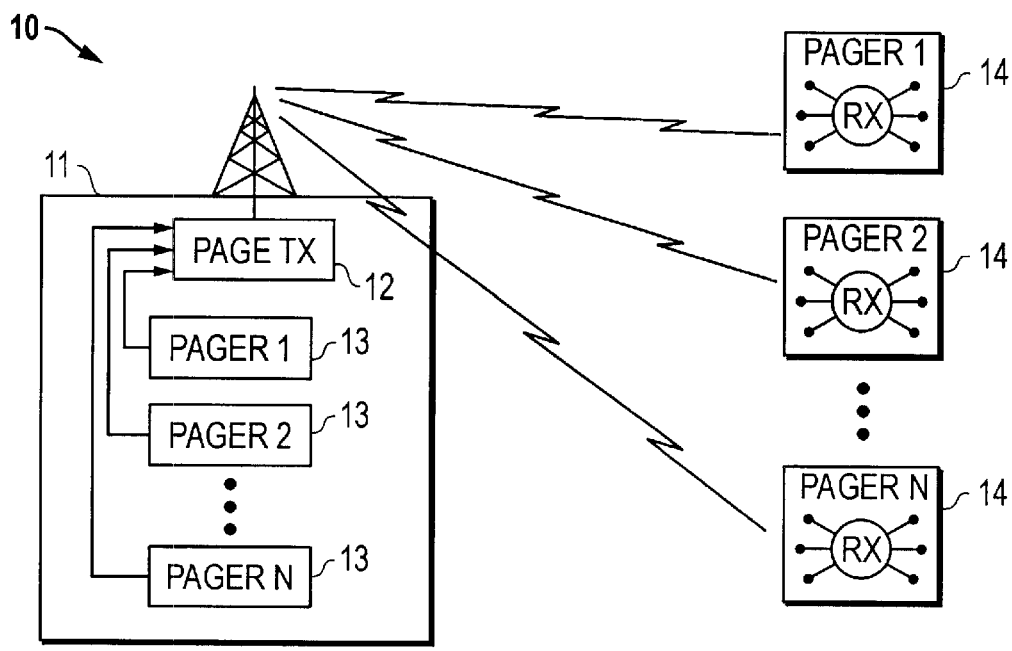
FIG. 1 (Prior Art) is a simplified block diagram of an existing on-premises paging system.
Figure 2:
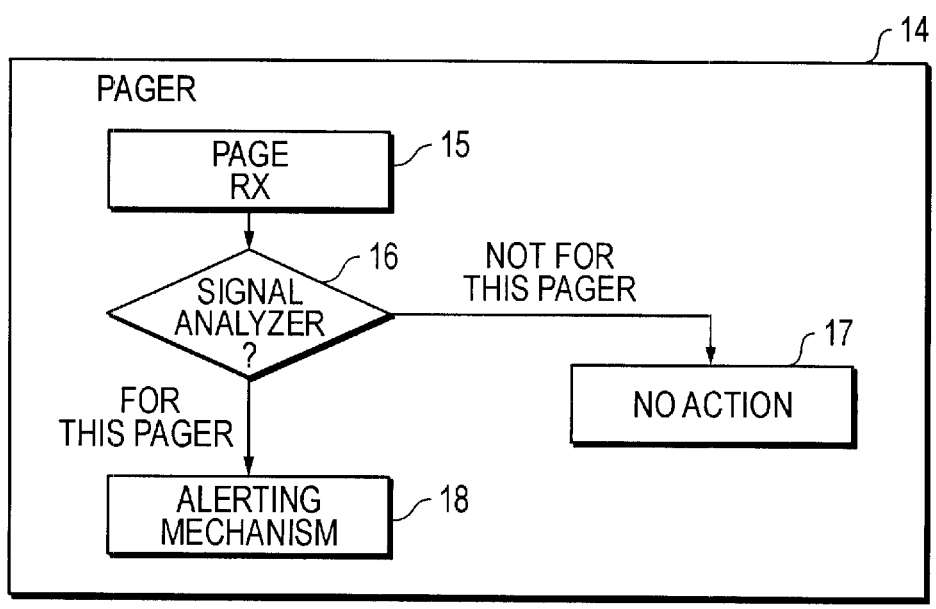
FIG. 2 (Prior Art) is a simplified functional block diagram of one of the plurality of pagers in the existing system of FIG. 1.
Figure 3:
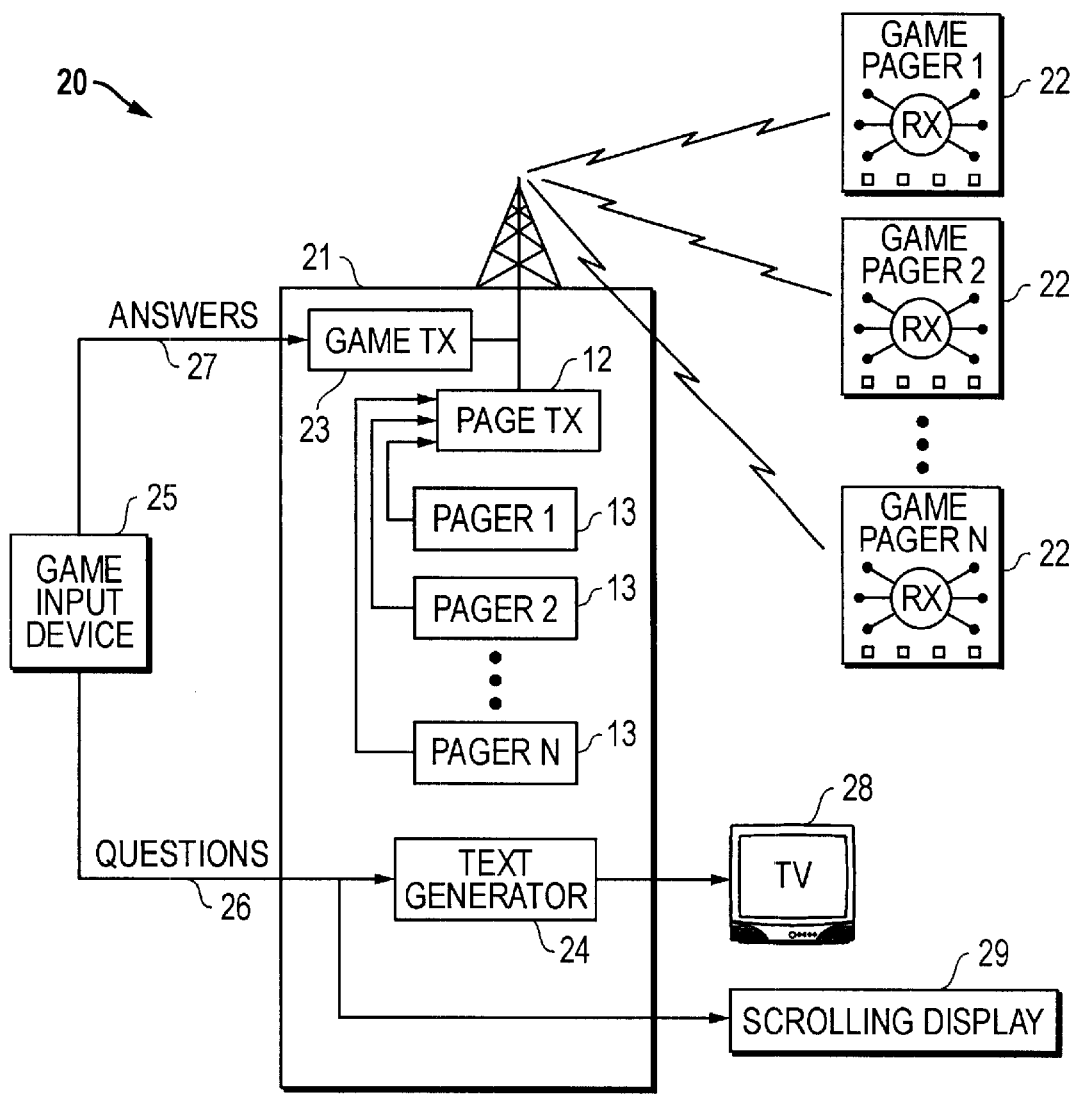
FIG. 3 is a simplified block diagram of a first exemplary embodiment of the on-premises paging system of the present invention.

FIG. 3 is a simplified block diagram of a first exemplary embodiment of the on-premises paging system 20 of the present invention. This embodiment is useful for playing games such as trivia games in which a question is displayed on a public display screen for all players to see, while the answer to the question is transmitted to each pager. The user then enters an answer on a keypad on the pager, and receives an indication of whether the entered answer is correct.

A centralized control station 21 includes the page transmitter 12 and the plurality of buttons 13 which may be pressed individually to send a page to one of an associated plurality of game pagers 22. The control station also includes a game transmitter 23 and a text generator 24. A game input device 25 is connected to the control station by any suitable means by which game questions 26 and game answers 27 may be input to the control station. The game input device may be physically located within the control station, or it may be located in an external location. In the preferred embodiment, the game questions 26 are sent from the game input device to the text generator where they are converted for displaying text on a television screen 28.

Alternatively, if properly formatted, the questions may be sent directly to a scrolling alpha-numeric display 29. In a restaurant environment, the television may be a large screen television, and the scrolling display may be a large display which is mounted in a position where it may be seen by all the waiting customers.

Figure 4:
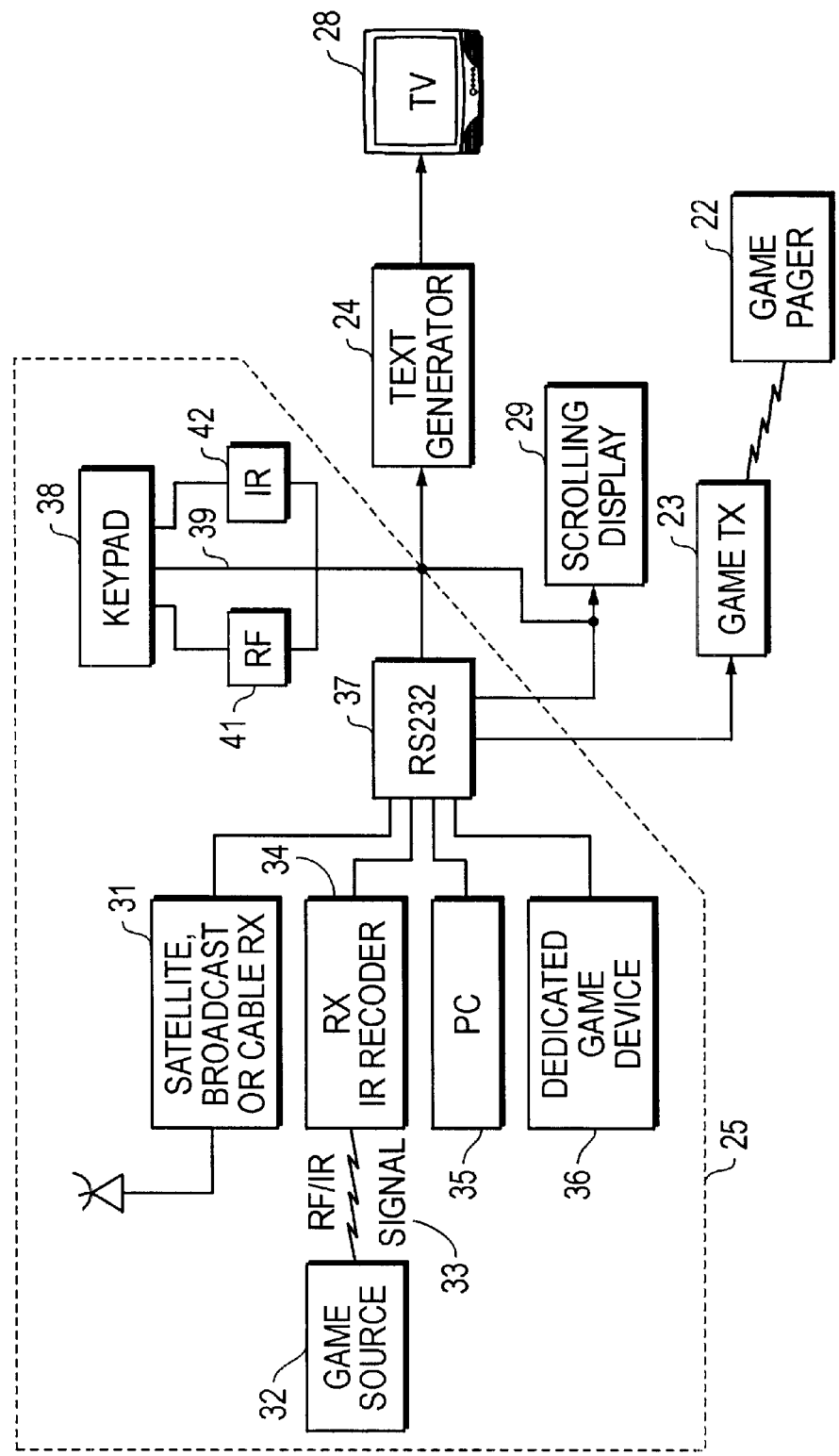
FIG. 4 is a more detailed block diagram of the game input device of FIG. 3.

FIG. 4 is a more detailed block diagram of the on-premises paging system 20 of FIG. 3, showing in particular, more detail of the game input device 25. The data for the game may come from any one of a plurality of sources. For example, through a cooperative agreement with broadcasters, the game data may be received through a satellite, broadcast, or cable receiver 31. Alternatively, a game source 32 may feed a signal 33 to a decoder 34. The signal may be any suitable signal for data transfer, such as a radio frequency (RF) signal, an infrared (IR) signal, wireline signal, or other optical signal. In another configuration, the game may be run on a personal computer (PC) 35 or on a dedicated game device 36.

In each of the above alternatives, the game signal may then be ported through a port such as an RS232 port 37 to the text generator 24 and television 28, to the scrolling display 29, and to the game transmitter 23 for transmission to the game pager 22. Alternatively, a keypad 38 may be utilized to enter game data directly to the text generator and/or the scrolling display. The keypad may be connected by any suitable means including, but not limited to cable 39, RF link 41, and IR link 42.

Figure 5:
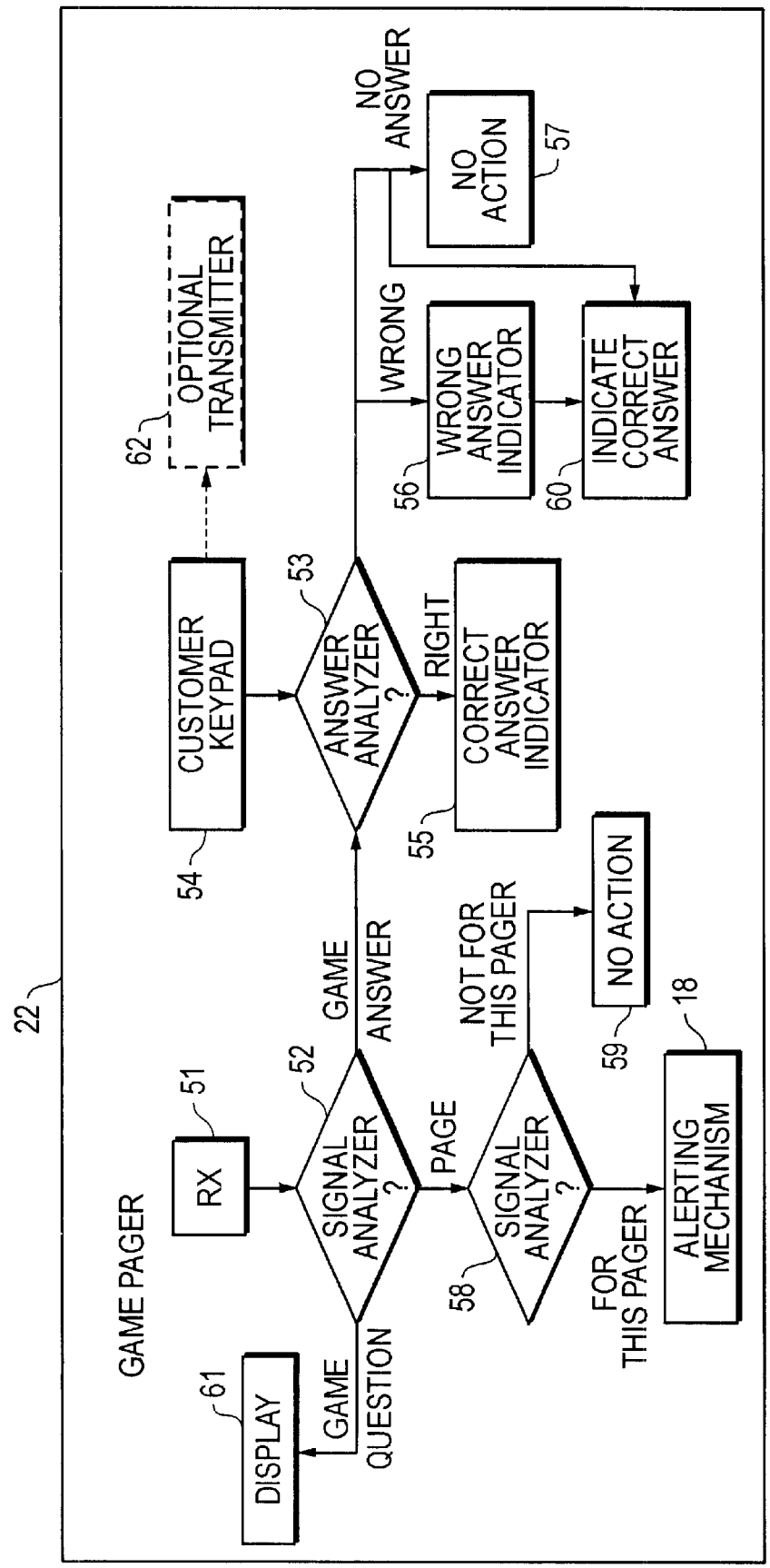
FIG. 5 is a simplified functional block diagram of a first exemplary embodiment of the game pager of the present invention.

FIG. 5 is a simplified functional block diagram of a first exemplary embodiment of the game pager 22 of the present invention. The game pager includes a receiver 51 which receives signals from both the page transmitter 12 and the game transmitter 23 (FIG. 3). A first-level signal analyzer 52 then determines whether the received signal is a page, a game answer, or a game question. If the received signal is a page, a second-level signal analyzer 58 determines whether the signal is a page intended for that pager. If not, no action is taken at 59. If the signal is a page intended for that pager, the pager activates the alerting mechanism 18 which visually, audibly, or tactily alerts the user that a page has been received.

If the received signal is a game answer, the answer is sent to an answer analyzer 53. The waiting customer, after seeing the game question on the television 28 or scrolling display 29, enters an answer using a input device such as a customer keypad 54 located on the game pager. The answer analyzer then determines whether the customer's answer is correct.

If the customer enters the correct answer, the answer analyzer 53 activates a correct answer indicator 55. If the customer enters an incorrect answer, the answer analyzer activates a wrong answer indicator 56 and may then indicate the correct answer at 60. The indicators may provide visual indications on a display such as an LED display 61, or audio indications from a speaker, or both. If the customer does not answer, the pager may indicate the correct answer at 60 or may take no action at 57. Thus, if a customer does not wish to enter answers, he may passively observe the correct answers. In other embodiments of the game pager 22, the game questions may also be transmitted to the game pager rather than to the television 28 or the scrolling display 29. In this case, the first-level signal analyzer sends the questions to the LED display 61.

In additional embodiments, different games can also be played. For example, the LED display on each pager may display a game card such as a unique Bingo card for each pager. This game is passive on the part of the customer. The control station periodically transmits another Bingo number to the game pagers. As numbers are received which are included on the pager's Bingo card, the associated space is filled.

The game pager may also be programmed with self-contained games such as memory games. For example, a plurality of lighted buttons on the pager may be illuminated in a particular sequence, and the user must repeat the sequence by pressing the buttons in the same order. A speaker in the game pager may make an associated audio sound with each illumination. The sequence increases in length after each correct response by the user. As in all of the embodiments of the game pager, the pager is programmed to sound an alarm and then deactivate if it is taken out of range of the central control station. This reduces the possibility that a customer may accidentally leave the premises with a pager, and it reduces the incentive for theft of the pagers since they are useless off the premises.

Table 1 indicates examples of the types of games that can be played utilizing the game pager system of the present invention.

TABLE 1

| | TRIVIA | BINGO | MEMORY |
| --- | --- | --- | --- |
| Data flow between control station and game pager | One-way or two-way | One-way from control station to game pager | Self-contained in game pager |
| Input (control station to game pager) | RF | RF | None |
| Input (User to game pager) | Keypad | None | Buttons |
| Output (Game pager to user) | LED/Audio | LED/Audio | LED/Audio |

In another embodiment, the game pager 22 includes an optional user-input transmitter 62 for transmitting user inputs back to the control station 21 for keeping score and for competing with other users.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. A combination on-premises paging and gaming system enabling a user to play an electronic game while waiting for an on-premises page, said system comprising:
   a page transmitter for transmitting paging signals on the premises;
   a game transmitter for transmitting game answers on the premises; and
   a combination on-premises pager and electronic game device comprising:
      a receiver for receiving the on-premises paging signals and the game answers;
      an alerting mechanism connected to the receiver for alerting the user that a page has been received;
      an electronic game contained within the on-premises device for playing by the user while waiting for a page; and
      a signal analyzer connected to the receiver that distinguishes received paging signals from received game answers, said signal analyzer being adapted to:
         send a received game answer to an indicator that indicates the received game answer to the user, upon determining that a received signal is a game answer; and send a page indication to the alerting mechanism, upon determining that the received signal is a paging signal.

2. The combination paging and gaming system of claim 1 further comprising a public display screen electronically linked to the transmitter station for displaying game questions.

3. The combination paging and gaming system of claim 2 wherein the public display screen is a television.

4. The combination paging and gaming system of claim 2 wherein the public display screen is a scrolling alphanumeric display.

5. The combination paging and gaming system of claim 2 wherein the electronic game includes:
   a user input device for inputting user answers to the game questions; and
   an answer analyzer connected to the signal analyzer for receiving game answers from the signal analyzer and comparing the game answers to the input user answers.

6. The combination paging and gaming system of claim 5 wherein the electronic game also includes:
   a correct answer indicator connected to the answer analyzer for indicating that the input user answer is correct; and
   a wrong answer indicator connected to the answer analyzer for indicating that the input user answer is not correct.

7. The combination paging and gaming system of claim 6 further comprising a game input device for sending game questions to the public display screen and for sending game answers to the game transmitter.

8. The combination paging and gaming system of claim 7 wherein the game input device also includes means for keeping score for a plurality of pager and electronic game devices, and each combination pager and game device also includes a user-input transmitter connected to the user input device for transmitting input user answers to the means for keeping score.

9. The combination paging and gaming system of claim 7 wherein the game input device is selected from a group of game sources consisting of:
   a satellite transmission;
   a radio frequency (RF) broadcast;
   a cable connection to a remote source;
   a personal computer (PC); and
   a dedicated game device.

10. The combination paging and gaming system of claim 1 wherein the game transmitter also transmits game questions, and the electronic game contained within the on-premises device includes:
    a display screen for displaying the game questions;
    a user input device for inputting user answers to the game questions;
    an answer analyzer connected to the signal analyzer for receiving game answers from the signal analyzer and comparing the game answers to the input user answers;
    a correct answer indicator connected to the answer analyzer for indicating that the input user answer is correct; and
    a wrong answer indicator connected to the answer analyzer for indicating that the input user answer is not correct.

11. A combination pager and electronic game device comprising:
    a radio frequency (RF) receiver, wherein the RF receiver receives paging signals from an external page transmitter and receives game answers from an external game transmitter;
    an alerting mechanism connected to the receiver for alerting a user that a paging signal has been received;
    an electronic game contained within the device for playing by the user while waiting for a page; and
    a signal analyzer connected to the receiver that distinguishes received paging signals from received game answers, said signal analyzer being adapted to:
      send a received game answer to an indicator that indicates the received game answer to the user, upon determining that a received signal is a game answer; and
      send a page indication to the alerting mechanism, upon determining that the received signal is a paging signal.

12. The combination pager and electronic game device of claim 11 wherein the electronic game contained within the device generates game questions, and the combination pager and electronic game device further comprises:
    a display screen for displaying the game questions;
    a user input device for inputting user answers to the game questions; and
    an answer analyzer connected to the signal analyzer for receiving game answers from the signal analyzer and comparing the game answers to the input user answers.

13. The combination pager and electronic game device of claim 11 wherein the RF receiver also receives game questions from the external game transmitter, and the combination pager and electronic game device further comprises:
    a display screen for displaying the game questions;
    a user input device for inputting user answers to the game questions; and
    an answer analyzer connected to the signal analyzer for receiving game answers from the signal analyzer and comparing the game answers to the input user answers.

14. The combination pager and electronic game device of claim 13 further comprising:
    a correct answer indicator connected to the answer analyzer for indicating that the input user answer is correct; and
    a wrong answer indicator connected to the answer analyzer for indicating that the input user answer is not correct.

15. The combination pager and electronic game device of claim 12 further comprising:
    a user input device for inputting user answers to the game questions; and
    a user-input transmitter connected to the user input device for transmitting input user answers to an external game controller.

* * * * *